US012619219B2

(12) United States Patent
Bachiraju

(10) Patent No.: US 12,619,219 B2
(45) Date of Patent: May 5, 2026

(54) FABRICATION FINGERPRINT FOR PROACTIVE YIELD MANAGEMENT

(71) Applicant: Onto Innovation Inc., Wilmington, MA (US)

(72) Inventor: Prasad Bachiraju, Nashua, NH (US)

(73) Assignee: ONTO INNOVATION INC., Wilmington, MA (US)

( * ) Notice: Subject to any disclaimer, the term of this patent is extended or adjusted under 35 U.S.C. 154(b) by 585 days.

(21) Appl. No.: 17/724,952

(22) Filed: Apr. 20, 2022

(65) Prior Publication Data

US 2022/0334567 A1 Oct. 20, 2022

Related U.S. Application Data

(60) Provisional application No. 63/252,281, filed on Oct. 5, 2021, provisional application No. 63/177,377, filed on Apr. 20, 2021.

(51) Int. Cl.
*G05B 19/418* (2006.01)

(52) U.S. Cl.
CPC .................. *G05B 19/41875* (2013.01); *G05B 2219/32368* (2013.01); *G05B 2219/45031* (2013.01)

(58) Field of Classification Search
None
See application file for complete search history.

(56) References Cited

U.S. PATENT DOCUMENTS

| 6,073,501 A | 6/2000 | Rohner |
| 6,744,266 B2 | 6/2004 | Dor |

| 6,807,454 B2 | 10/2004 | Wang |
| 6,885,977 B2 | 4/2005 | Gavra |
| 6,890,774 B2 | 5/2005 | Flanner |
| 7,106,897 B1 | 9/2006 | McIntyre et al. |
| 7,533,313 B1 * | 5/2009 | Retersdorf ......... G01R 31/2894 |
| | | 714/724 |
| 7,987,150 B1 | 7/2011 | Luu |
| 9,165,843 B2 | 10/2015 | Chen |

(Continued)

FOREIGN PATENT DOCUMENTS

| CN | 107923731 B | 11/2020 |
| CN | 108463874 B | 11/2020 |

(Continued)

OTHER PUBLICATIONS

Chen-Fu Chien et al., Analysing semiconductor manufacturing big data for root cause detection of excursion for yield enhancement, International Journal of Production Research, 55:17, 5095-5107, (2017).

(Continued)

*Primary Examiner* — Ryan A Jarrett

(74) *Attorney, Agent, or Firm* — Merchant & Gould P.C.

(57) ABSTRACT

Systems and methods for improving wafer fabrication. Wafers may be inspected at various points in the fabrication process to generate inspection data. The inspection data and wafer-in-progress data may be used to identify defect patterns and tools and/or processes that cause wafer defects. The inspection data may be stacked to form virtual wafer maps that amplify signals to detect patterns more easily. Defect patterns and tools and/or processes may also be identified through machine learning models receiving artificial defect visualizations as input.

30 Claims, 9 Drawing Sheets

(56) References Cited

U.S. PATENT DOCUMENTS

| | | | |
|---|---|---|---|
| 10,228,421 | B2 | 3/2019 | Leu |
| 10,241,418 | B2 | 3/2019 | Hauptmann |
| 10,650,508 | B2 | 5/2020 | Chang |
| 10,657,638 | B2 | 5/2020 | Milligan |
| 10,692,203 | B2 | 6/2020 | Kong |
| 10,922,807 | B2 | 2/2021 | Moioli |
| 2003/0072481 | A1 | 4/2003 | Wooten |
| 2003/0135295 | A1 | 7/2003 | Dor |
| 2003/0212469 | A1 | 11/2003 | Wang et al. |
| 2007/0038325 | A1 | 2/2007 | Guldi et al. |
| 2018/0047149 | A1* | 2/2018 | Trumbauer ............... G06T 7/70 |
| 2018/0330493 | A1 | 11/2018 | Milligan |

FOREIGN PATENT DOCUMENTS

| | | | |
|---|---|---|---|
| KR | 101602580 | B1 | 3/2016 |
| KR | 102073361 | B1 | 1/2020 |
| TW | I313903 | B | 8/2009 |
| TW | 202028882 | A | 8/2020 |

OTHER PUBLICATIONS

Shu-Min Li, K. et al., "TestDNA: Novel Wafer Defect Signature forDiagnosis and Pattern Recognition," Auckland University of Technology, downloaded on Jun. 5, 2020 at 18:31:35 UTC from IEEE Xplore.

Drozda-Freeman et al., "The Application and Use of an Automated Spatial Pattern Recognition (SPR) System in the Identification and Solving of Yield Issues in Semiconductor Manufacturing," 2007 IEEE/SEMI Advanced Semiconductor Manufacturing Conference.

Carlson et al., "Use of Wafer Backside Inspection and SPR to Address Systemic Tool and Process Issues," Rudolph Technologies, Inc., IBM Corporation, Systems & Technology Group, Presented at SPIE (international society for optics and photonics), Feb. 2010.

Notification of Transmittal of the International Search Report and the Written Opinion of the International Searching Authority for PCT/US2022/025602 dated Aug. 5, 2022 (11 pages).

\* cited by examiner

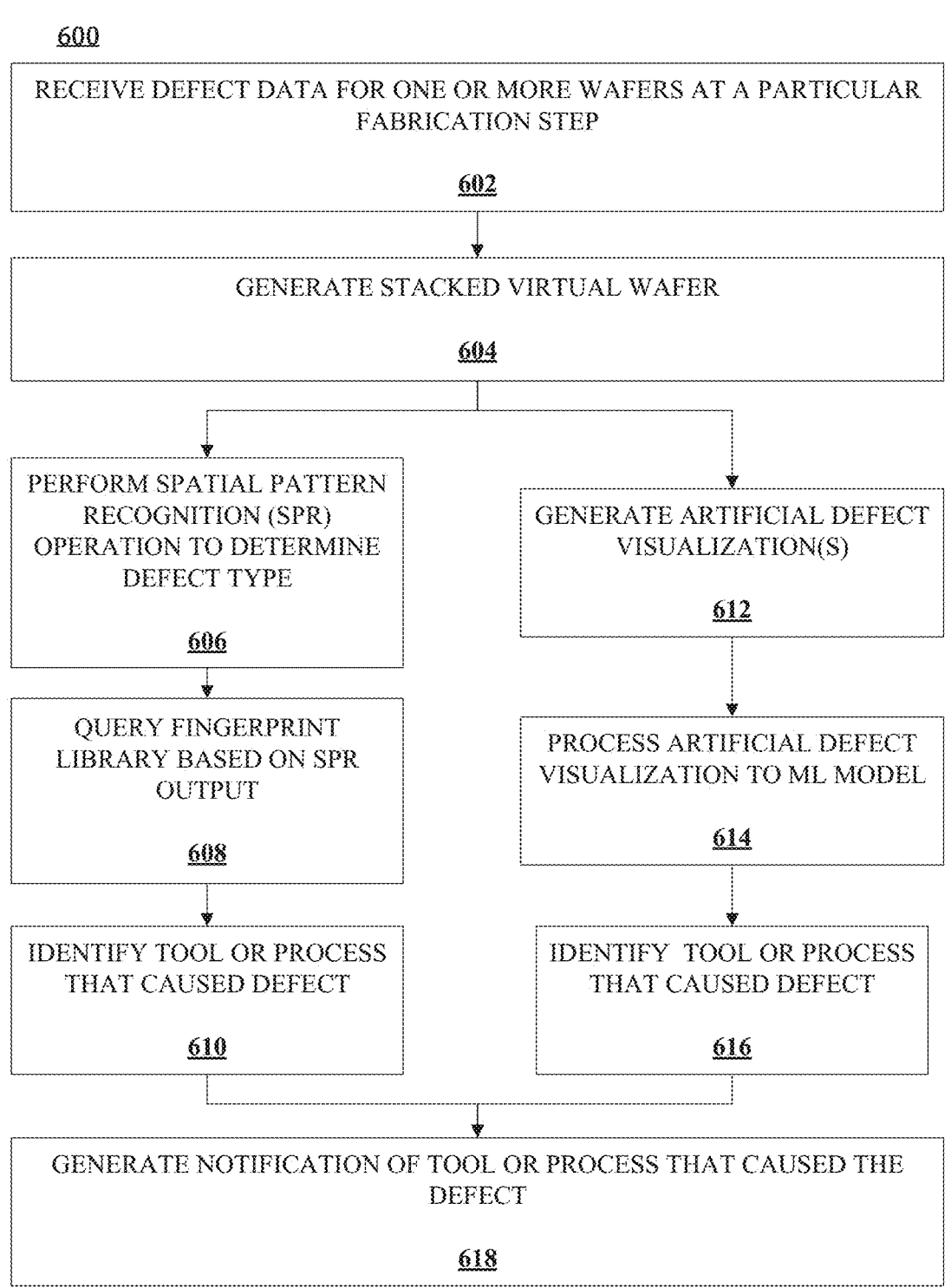

600

RECEIVE DEFECT DATA FOR ONE OR MORE WAFERS AT A PARTICULAR
FABRICATION STEP

602

GENERATE STACKED VIRTUAL WAFER

604

PERFORM SPATIAL PATTERN
RECOGNITION (SPR)
OPERATION TO DETERMINE
DEFECT TYPE

606

GENERATE ARTIFICIAL DEFECT
VISUALIZATION(S)

612

QUERY FINGERPRINT
LIBRARY BASED ON SPR
OUTPUT

608

PROCESS ARTIFICIAL DEFECT
VISUALIZATION TO ML MODEL

614

IDENTIFY TOOL OR PROCESS
THAT CAUSED DEFECT

610

IDENTIFY  TOOL OR PROCESS
THAT CAUSED DEFECT

616

GENERATE NOTIFICATION OF TOOL OR PROCESS THAT CAUSED THE
DEFECT

FABRICATION FINGERPRINT FOR PROACTIVE YIELD MANAGEMENT

RELATED APPLICATIONS

This application claims priority to U.S. Provisional Patent Application Ser. No. 63/177,377, entitled FABRICATION FINGERPRINT FOR PROACTIVE YIELD MANAGEMENT, filed on Apr. 20, 2021, and U.S. Provisional Patent Application Ser. No. 63/252,281, entitled FABRICATION FINGERPRINT FOR PROACTIVE YIELD MANAGEMENT, filed on Oct. 5, 2021, the disclosures of which are hereby incorporated by reference in their entireties.

FIELD OF DISCLOSURE

The present disclosure is directed to semiconductor component manufacturing and defect and yield management.

BACKGROUND

Semiconductor wafers are manufactured or fabricated as part of the formation of semiconductor chips or other types of integrated circuits (ICs). The components of the ultimate IC may be incorporated into the wafer through a series of fabrication steps. The fabrication steps may include deposition steps where a thin film layer is added onto the wafer. The wafer then may be coated with a photoresist and the circuit pattern of a reticle may be projected onto the wafer using lithography techniques. Etching processes may then occur. Additional fabrication steps will be appreciated by those having skill in the art. At each fabrication step, the tool performing the fabrication step may cause defects or imperfections on the wafer.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for improving wafer fabrication. In one aspect, the technology relates to a method for identifying a tool or process causing wafer defects. As used herein, a wafer defect is a physical defect in or on a wafer. The method includes inspecting, by an inspection device, a wafer to identify defects in the wafer after the wafer has been processed by at least one fabrication tool performing a fabrication process on the wafer; based on the inspection data generated from the inspection process, generating a wafer map; and a performing spatial pattern recognition (SPR) operation on the wafer map using a fingerprint library generated from wafer-in-progress (WIP) data, wherein the output of the SPR operation includes an identification of at least one of: a fabrication tool, a fabrication process, an inspection device, or an inspection process that caused a defect.

As used herein, the term "inspection data" can include one or more of inspection test data, metrology test data, and/or electrical test data generated from respective processes.

In an example, the output of the SPR includes a type of the defect.

In another example, the fabrication tool is a fabrication tool in a production line.

In another example, the wafer map is represented as data, rather than an image, representing the locations of the identified defects.

In another example, the wafer map is a stacked virtual wafer map generated from wafer maps of a plurality of wafers that have been processed by the same tool.

In a further example, the method further includes providing an image of the wafer map as input into a trained machine learning model; processing the image by the trained machine learning model to generate an output; and based on the output from the machine learning model, generating an indication of a type of defect represented in the wafer map.

In a further example, the method further includes, based on the output, generating an indication of at least one of a tool or process that caused the defect.

In another example, the method further includes generating at least one recognized fingerprint pattern based on an analysis of a first plurality of wafer maps and first wafer-in-progress (WIP) data for wafers processed in a first fabrication facility, wherein the first WIP data includes process and tool data for the wafers corresponding to the first plurality of wafer maps; and storing the generated at least one fingerprint pattern into a fingerprint library.

In still another example, performing the SPR operation includes comparing the wafer map to fingerprint patterns in the fingerprint library.

In yet another example, the method further includes generating another recognized fingerprint pattern based on an analysis of a second plurality of wafer maps and second WIP data for wafers processed in a second fabrication facility; and storing the another recognized fingerprint pattern in the fingerprint library.

In still yet another example, the fingerprint library is stored in a cloud-based server accessible by a first computing device in the first fabrication facility and a second computing device in a second fabrication facility.

In another aspect, the technology relates to a system for identifying a tool or a process causing wafer defects. The system includes at least one processor; and memory storing: a fingerprint library; and instructions that, when executed by the at least one processor, cause the system to perform operations. The operations include: receiving, from a first fabrication facility, a first wafer map for a first wafer being fabricated at the first fabrication facility; based on the first wafer map and the fingerprint library, providing a first identification of at least one of: a fabrication tool in the first fabrication facility, a fabrication process performed in the first fabrication facility, an inspection device in the first fabrication facility, or an inspection process performed in the first fabrication facility that caused a defect of the first wafer.

In an example, the operations further include receiving, from a second fabrication facility, a second wafer map for a wafer being fabricated at the second fabrication facility; and based on the second wafer map and the fingerprint library, providing a second identification of at least one of: a fabrication tool in the second fabrication facility, a fabrication process performed in the second fabrication facility, an inspection device in the second fabrication facility, or an inspection process performed in the second fabrication facility that caused a defect of the second wafer.

In an example, the operations further include receiving, from the first fabrication facility, additional wafer maps generated from inspection data of wafers at a same fabrication step; generating a stacked virtual wafer map based on the first wafer map and the received additional wafer maps; and the first identification is based on the stacked virtual wafer map.

In another example, the operations further include generating an artificial defect visualization of the stacked virtual wafer map; providing the defect visualization as input to a trained machine learning model; and processing, by the trained machine learning model, the input to generate an output indicating the first identification.

In yet another example, the operations further include sending a notification of the first identification to the first fabrication facility; and sending a notification of the second identification to the second fabrication facility.

In another aspect, the technology relates to a method for identifying a tool or process causing defects on wafers. The method includes accessing first inspection data for a first wafer at a processing step in a fabrication process; accessing second inspection data for a second wafer at the processing step in the fabrication process; additively combining the first inspection data and the second inspection data to form a stacked virtual wafer map; and based on the stacked virtual wafer map, identifying a type of defect and an identification of at least one of: a tool and a process that caused a defect of at least one of the first wafer or the second wafer.

In an example, the first wafer and the second wafer are from different wafer lots.

In another example, the inspection data includes at least one of defect data, wafer probe data, or metrology data.

In still another example, the first wafer and the second wafer are processed by the same fabrication tools.

In yet another example, the method further includes performing spatial pattern recognition (SPR) operation on the virtual wafer map using a fingerprint library generated from wafer-in-progress (WIP) data, wherein the output of the SPR operation includes the type of defect and the identification.

In still another example, the method further includes generating a defect visualization from the stacked virtual wafer map; providing the defect visualization as input to a trained machine learning model; and processing, by the trained machine learning model, the input to generate an output indicating the type of defect and the identification.

In a further example, the input also includes WIP data for the wafers forming the stacked virtual wafer map.

In another aspect, a system for identifying a tool or process causing wafer defects includes: at least one processor; and memory storing instructions that, when executed by the at least one processor, cause the system to generate, using a display device, a graphical interface including a chart portion and an image portion, the chart portion including a chart representing wafer defect data, wherein selection of a subset of the wafer defect data from the chart causes the graphical interface to display, in the image portion, one or more images of one or more wafer defect maps corresponding to the subset of the wafer defect data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 6 depicts an example method for identifying a tool or process causing one or more defects on a wafer.

DETAILED DESCRIPTION

Figure 1A:
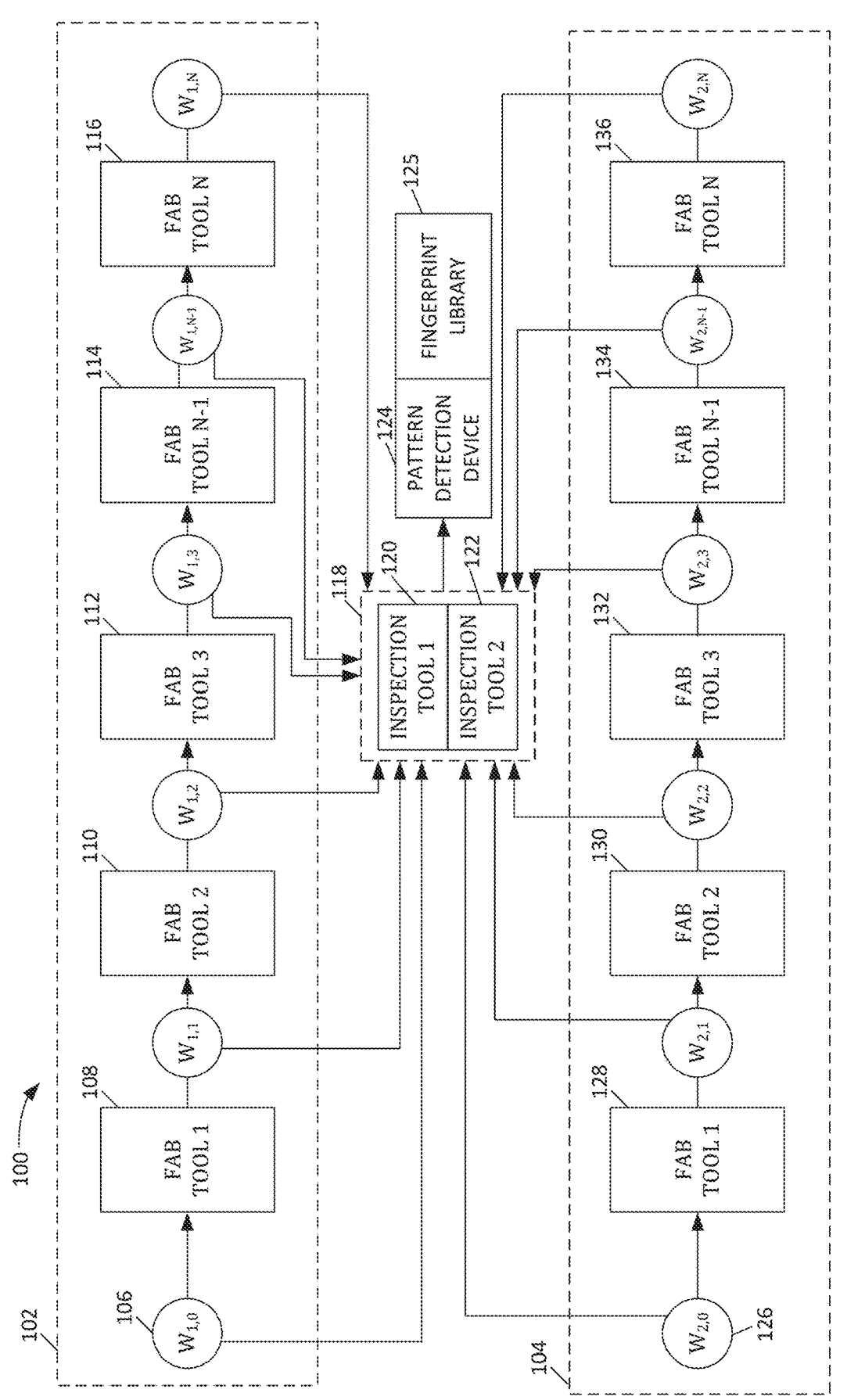
FIG. 1A depicts an example wafer fabrication system.

As discussed above, during wafer fabrication, the wafer undergoes many process steps that are performed by various tools. The tool or some other factor (such as manual handling of the wafer during the process) may cause one or more wafer defects, such as a scratch or deposition of unwanted materials. To identify these defects, the wafer may be inspected using various inspection tools at different stages of the fabrication process. When the wafer is inspected, defects, along with the location of the defects, are recorded as defect data. These defects may be represented visually as a defect map of the wafer that shows the defect and the location of the defect on a representative image of the wafer.

Based on the defect data and, in some examples, other inspection data, the type of defect may be determined from a pattern of defects. The pattern recognition process to recognize a type of defect is known as Spatial Pattern Recognition (SPR). SPR generally involves generating feature vectors and/or comparing the defect patterns to a library of patterns. Current SPR techniques, however, only identify the type of defect (e.g., a scratch), but those SPR techniques do not identify any root causes of the defect—such as which fabrication process or tool caused the defect in the particular fabrication line used to fabricate the wafer. Instead, an engineer has to take time to analyze the process and patterns to figure out what went wrong, which can take substantial amounts of time. Moreover, while the engineer is attempting to identify the root cause, the wafer continues through the manufacturing process and the tool that is causing defects also continues to operate and perform processes on the wafer. Accordingly, additional wafers may become damaged by the malfunctioning tool, and additional resources are wasted by continuing to process wafers that are already damaged.

The present technology provides for a pattern recognition system that identifies not only the type of defect, but also the specific tool or process that caused the defect. For instance, when a wafer defect map is analyzed under SPR, the ultimate result indicates the tool and/or process that likely caused the defect.

In some sense, the tool leaves a defect "fingerprint" on the wafer when it performs the respective process. To allow for the identification of the tool or process that caused the defect, a pattern library may be built based on the recognized patterns and data about the tools and processes that have been performed on the wafer. This library may be referred to as a "fingerprint library." The data regarding the tools and processes applied to the wafer may be referred to as wafer-in-progress (WIP) data. The new patterns for the fingerprint library may be identified automatically based on the WIP data and inspection data, such as defect data in defect maps for the wafers, probe data for the wafers, and/or metrology data for the wafers.

In some instances, the defect pattern may be faint, which makes pattern recognition difficult. To help alleviate that issue, the present technology is able to amplify the pattern to allow for better pattern recognition. For example, the present technology can "stack" the defect maps or wafer maps from multiple wafers that were processed by the same tool. For instance, all defects from a group of wafers processed by the tool may be added together and represented in a single wafer map, referred to as a stacked virtual wafer map. That stacked virtual wafer map may then be used for SPR and the identification of the root cause (e.g., the process and/or tool that caused the defect) as discussed above. Other types of inspection data, such as probe data and metrology data, may be stacked in similar manners.

In addition, current SPR techniques utilize the underlying data (e.g., text files) of the wafer maps to perform the SPR operations, such as data within a KLARF file. For instance, the wafer maps are based on underlying data indicating the x,y coordinates of the defects, and the SPR operations are performed using that data file as input rather than an image of the wafer map. The present technology, however, may utilize an artificial defect visualization, rather than the underlying data, to identify tools and/or processes that may have caused the defects. For example, the artificial defect visualization may be provided to a trained neural network, such as a convolutional neural network, to identify the type of defect and the tool or process responsible for creating the defect. Additional visualizations may be generated from probe data and/or metrology data and used in a similar manner.

The network architecture to facilitate the above features may also include a cloud-computing environment that allows the fingerprint library to be augmented and updated from multiple different sources. For example, data from multiple fabrication facilities may be collected and new patterns and root causes may be generated that can be stored in the fingerprint library. New customers may then access the augmented and updated fingerprint library through a cloud-based interface or API. Further, a cloud-based server may receive the live inspection data from fabrication facilities, generate the stacked virtual wafer maps, and identify the tools and/or processes that caused the defects.

FIG. 1A depicts an example wafer fabrication system 100. The fabrication system 100 may include multiple fabrication lines, such as a first fabrication line 102 and a second fabrication line 104, for fabricating wafers. Each of the fabrication lines 102, 104 may include a plurality of fabrication tools. For example, the first fabrication line 102 may include 1-N fabrication tools, such as a first fabrication tool 108, a second fabrication tool 110, a third a fabrication tool 112, and an N−1 fabrication tool 114, and an Nth fabrication tool 116, where N is an integer greater than 1. Similarly, the second fabrication line 104 may include a first fabrication tool 128, a second fabrication tool 130, a third fabrication tool 132, an N−1 fabrication tool 134, and an Nth fabrication tool 136. The fabrication tools may include various types of fabrication tools used in a wafer fabrication process, such as oxidation systems, epitaxial reactors, diffusion systems, ion implantation equipment, physical vapor deposition systems, chemical vapor deposition systems, photolithography equipment, and etching equipment, among other types of tools. While only five fabrication tools are depicted in the first fabrication line 102 and the second fabrication line 104, fewer or more fabrication tools may be utilized. Fewer or more fabrication steps may also be performed, including hundreds of fabrication or processing steps in some examples.

A first wafer 106 may be fabricated by proceeding through the first fabrication line 104. Each of the fabrication tools 108, 110, 112, 114 and 116 may perform a process step on the first wafer 106. In some examples, the first wafer 106 may be processed by the same fabrication tool more than once. For instance, multiple deposition, lithography, and/or etching steps may be performed on the first wafer 106. The wafer and its respective step may be represented with the following nomenclature: $W_{A,B}$, where A represents the wafer number and B represents the processing stage of the wafer. In the example depicted, the first wafer 106 is represented by $W_{1,1}$ after the first processing step. After the second processing step, the first wafer 106 may be represented by $W_{1,2}$.

After one or more processing steps are performed on the first wafer 106, the first wafer 106 is inspected by one or more wafer inspection tools in a set of wafer inspection tools 118. The inspection tools 118 may include at least a first inspection tool 120 and a second inspection tool 122. The first inspection tool 120 and the second inspection tool 122 may be the same or different types of inspection tools. The inspection tools 118 may include inspection tools such as optical detection systems that capture images of the wafer and/or perform other optical or electrical testing on the wafer to identify defects. The inspection tools 118 may utilize image capture, bright-field illumination, dark-field illumination, or a combination thereof for defect detection. The inspection tools 118 may also utilize electron beam (EB) imaging. Automatic Optical Inspection (AOI) defect and wafer probe defect inspection tools may also be utilized. Those having skill in the art will recognize additional inspection techniques and types of inspection tools. As some specific non-limiting examples, the inspection tools may include various inspection tools from Onto Innovations of Wilmington, Massachusetts, such as the Firefly system, the Dragonfly G3 system, the NovusEdge system, the F30 system, the EB30 module, the NSX 330 system, and/or the AWX FSI system, as well as inspection tools from other entities the provide similar functionality. The inspection tools 118 may also include metrology tools and/or wafer probe tools. The metrology tools and/or wafer tools may be combined with other types of inspection tools. The metrology tools may inspect the wafers to determine or measure characteristics of the wafer, such as layer thicknesses, overlay characteristics, and/or critical dimensions, among other things as will be appreciated by those having skill in the art. The wafer probe tools perform electrical testing of the dies on the wafer. The result of the probe testing may be a pass/fail indication for each of the tested dies.

The wafer data generated by the inspection tools 118 may generally be referred to as inspection data, which may include defect data, wafer probe data, and metrology data. For instance, the inspection tools 118 identify defects and the locations of the defects on the first wafer 106 to generate defect data. The defect data includes the location of the defect and, in some examples, additional detail about the defect (e.g., size, on surface, into surface, etc.). The defect data may be stored as an array or matrix of data. The defect data may be stored in various file types, such as an ASCII-based file or KLARF file format. The defect data may also be used to generate defect maps (a form of a wafer maps) as discussed further herein.

The inspection tools 118 may also generate wafer probe data that indicates whether each tested die passes or fails the probe test. The wafer probe data may be represented similarly as a wafer map, referred to as a probe map, that indicates the location of the die and whether the die passed or failed the probe test. Of note, the probe testing is done at the die level, but the defect inspection may be on a smaller scale. For instance, multiple defects in a single die may be detected and/or represented in a wafer map.

The inspection tools 118 may also generate metrology data, such as layer thicknesses, overlay characteristics, and/or critical dimensions, among other things as will be appreciated by those having skill in the art. The metrology data may also be represented visually on a wafer map as gradients of the measured characteristics. For instance, a thickness gradient for the wafer may be represented in a wafer map.

In addition to the inspection data captured by the inspection tools 118, wafer-in-progress (WIP) data may also be generated or captured by the fabrication system 100 for each wafer that is fabricated. The WIP data includes data regarding the tools that processed the wafer and the process steps that were performed by each of the tools. In addition, the WIP data may also include the inspection tools that inspected each wafer and the type of inspection performed by the inspection tool. Accordingly, the WIP data for each wafer represents the fabrication history for the wafer at any point in the fabrication process. In some examples, the WIP data may also include settings and/or maintenance records for the fabrication tools and/or the inspection tools.

The second fabrication line 104 may be used to fabricate a second wafer (W₂) 126. The second wafer is processed by the fabrication tools 128, 130, 132, 134 and 136. After one or more fabrication steps, the second wafer 126 may be inspected by the inspection tools 118 and inspection data for the second wafer 126 may be generated by the inspection tools 118. In addition, WIP data may be generated for the second wafer 126. The WIP data for the second wafer 126 indicates the specific fabrication tools 128, 130, 132, 134, 136 and the specific inspection tools 118 that have processed the second wafer 126. Thus, even for wafers that are intended to be fabricated in the same manner, the WIP data for second wafer 126 differs from the WIP data of the first wafer 106 because the first wafer 106 is processed by different fabrication tools 108, 110, 112, 114, 116 than the fabrication tools 128, 130, 132, 134, 136 that processed the second wafer 126, which may include the same type of tools. For instance, the WIP data may include the exact tools that processed the wafer rather than just a tool type that processed the wafer. The WIP data for the second wafer 126 also indicates the specific inspection tools 118 used to inspect the second wafer, which may include the same or different inspection tools 118 that were used to inspect the first wafer 106. While only a first wafer 106 and a second wafer 126 are depicted, it should be appreciated that many wafers may be fabricated by the fabrication tools 108, 110, 112, 114, 116 and the fabrication tools 128, 130, 132, 134, 136. Inspection data and WIP data may be generated for each of the processed wafers, or a subset of the processed wafers.

A pattern detection device 124 may be included in the fabrication system 100. The pattern detection device 124 may be a computing device, such as a server, that collects or receives inspection data and WIP data for the wafers that are processed. The pattern detection device 124 may be housed within a fabrication facility or outside of the fabrication facility, such as a cloud-based server. The pattern detection device 124 identifies patterns based on the inspection data and the WIP data, as discussed further herein. For example, based on the inspection data and the WIP data, the pattern detection device 124 is able to identify defect patterns that correspond to particular tools and/or processing steps, such as fabrication or inspection steps. These patterns may be referred to as "fingerprints" as the corresponding defect pattern is the marking or fingerprint left on the wafer by the corresponding tool or process. Thus, each fingerprint pattern may have a corresponding tool or process. The fingerprint patterns may include the corresponding tool or process and the features or patterns extracted from the defect data, the metrology data, and/or the wafer probe data. In some examples, the combination of the defect data, the metrology data, and/or the wafer probe data may provide a signature or fingerprint from the tool or process that is not discernible from the defect data alone. The fingerprint patterns and corresponding tools and/or processes may be generated from various methods, including unsupervised machine learning techniques or models that identify unknown classifications based on input data. In such an example, the input data to the unsupervised machine learning models may include the defect data and the WIP data for a plurality of wafers.

In some examples, inspections are not performed after each fabrication step. For instance, if there are 100 fabrication steps, an inspection may occur only for every 5 steps, every 10 steps, or every 20 steps of the fabrication process. Thus, the inspection data or defect data generated at that step is indicative of all the steps that occurred prior to the inspection point. Inferences can still be made, however, based on that data as to which tool or tools are most likely to have created a particular defect pattern. For instance, if an inspection occurs after fabrication steps 0 through 10, a defect type occurring at that point must have been due to one or more of fabrications steps 0 through 10 and/or the tools performing those steps (and/or the inspection device or inspection process). If an inspection is performed after steps 10 through 20, a defect type occurring at that point is likely due to one or more of fabrication steps 10 through 20 if the defect type was not present in the inspection data acquired after step 10. However, it is possible that the inspection performed after step 10 was not sensitive enough to detect the defects forming the defect type. In such a case, one of the fabrication steps 0 through 10 may have been the cause of the defect type identified only after fabrication step 20. In other words, the fabrication steps 0 through 10 may not be wholly ruled out as the root cause of the defect type detected after fabrication step 20.

To account for the fact that inspections may not be performed after every fabrication step and that some inspections may not be sensitive enough to detect particular defect types, the fingerprint patterns that are generated may be probabilities or scores assigned to fabrication steps and/or fabrication tools based on their likelihood that they caused the defect type. Such scores may be generated based on larger sets of data. For example, if a particular defect type most frequently occurs when a particular type of tool or process is used in the 10 steps immediately preceding the inspection (using the example from above), that tool or process may be assigned a higher probability or score. Thus, patterns in the fingerprint library may be associated with multiple tools or steps that each have an assigned score or probability. The patterns and correlations of root causes may be generated automatically based on the WIP data and the defect maps generated.

Once the fingerprint patterns have been identified by the pattern detection device 124, the fingerprint patterns may be stored in a fingerprint library 125, which may be a database in communication with the pattern detection device 124. The fingerprint library 125 may be stored in memory of the computing device serving as the pattern detection device

124. In other examples, the fingerprint library 125 may be stored in memory that is located remote from the pattern detection device 124. Accordingly, once a defect pattern is recognized, the pattern may be compared to the fingerprint patterns in the fingerprint library.

The pattern detection device 124 may also operate on live data for a singular wafer to determine the process or tool that has caused a defect on the wafer at any point in the fabrication process. For instance, at each (or any) point where inspection data is generated for a particular wafer, the inspection data may be provided to the pattern detection device 124. The pattern detection device 124 then determines, based on the inspection data, the particular tool and/or process that caused a defect on the wafer. The pattern detection device 124 may utilize SPR techniques to identify the patterns and then use a lookup or query method against the fingerprint patterns in the fingerprint library 125. In examples where the fingerprint library includes multiple possible tools and/or steps with assigned scores or probabilities corresponding to the defect type or pattern, the WIP data for a particular wafer may be used to eliminate the possible tools and/or steps if those tools and/or steps are not present in the WIP data.

The pattern detection device 124 may also utilize one or more trained machine learning models. For instance, the input to the trained machine learning model may be the inspection data for a wafer. In some instances, the input data may also include the WIP data for the wafer. The output of the machine learning model may be the defect type and/or the particular tool and/or process that caused the defect.

The trained machine learning models may be trained based on the fingerprint patterns and corresponding tools and/or processes stored in the fingerprint library 125. For instance, for training, the fingerprint patterns (and/or the defect maps or wafers having the fingerprint patterns) are used as the input and the output or ground truth is the corresponding tool and/or process. In some examples, the training input also includes the WIP data, and the output includes the defect type. Accordingly, the trained machine learning model is able to predict a tool and/or a process that caused a defect based on an input of inspection data for the wafer.

Once the root cause is identified, the identified or predicted tools and/or steps can be provided as a notification, a message, or via a dashboard. Accordingly, an engineer can more quickly see the most likely tools and/or steps that are causing defects. Scheduling and the fabrication process may then be changed. For example, wafers may be rerouted such that the tool is not utilized until the tool can be fixed or adjusted. Thus, wafers are potentially ruined by the identified tool or process step, and total yield of wafers may be improved overall. For instance, in some cases, some significant defect types may not be identified until an electrical probe test is performed on the final wafer, and portions of that wafer must be discarded and scrapped. With the present technology, the defect types can be identified sooner, the specific tools can be adjusted sooner, and fewer wafers ultimately need to be discarded or scrapped.

Figure 1B:
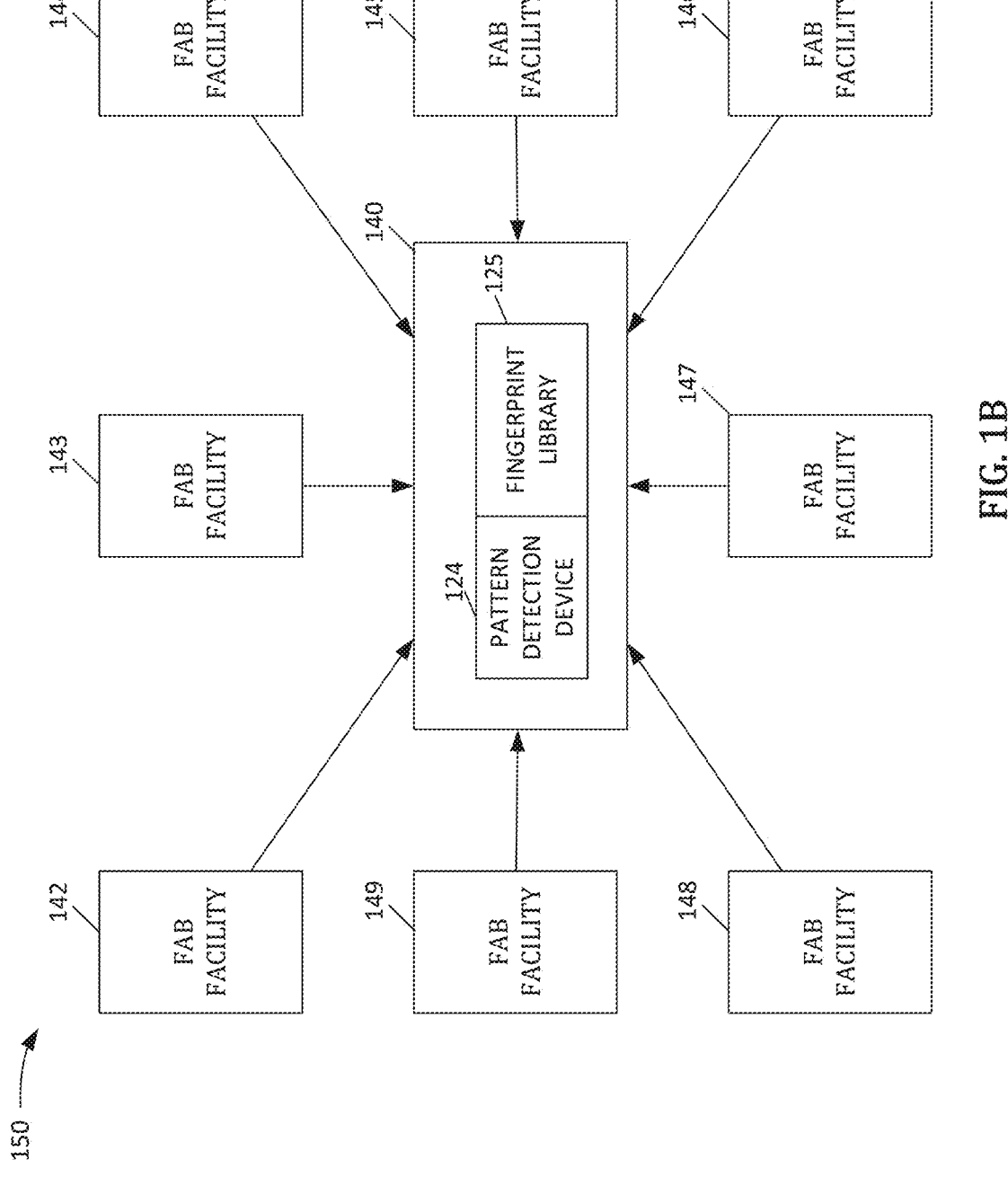
FIG. 1B depicts an example distributed system.

FIG. 1B depicts an example distributed system 150. The distributed system 150 includes a plurality of fabrication facilities 142-149 that are in communication with a server 140. More specifically, one or more computing devices within each of the fabrication facilities 142-149 may be in communication with the server 140.

The server 140 may be part of a cloud-based infrastructure. For instance, the server 140 may include a plurality of computing devices or components that may operate virtual machines to provide the functionality and operations described herein. The server 140 may include, or be, the pattern detection device 124. Memory of the server 140 may store the fingerprint library 125, and may have access to the pattern detection device 124.

Each of the fabrication facilities 142, 143, 144, 145, 146, 147, 148, 149 may include one or more fabrication lines, such as the fabrication lines 102, 104 discussed above. The fabrication lines may include fabrication tools that fabricate wafers and inspection tools that inspect wafers. Each of the fabrication facilities 142, 143, 144, 145, 146, 147, 148, 149 (hereinafter collectively referred to as 142-149) may be in communication with the server 140 via a network, such as the Internet. The fabrication facilities 142-149 may communicate data to the server 140 and receive data from the server 140. The communicated data may include inspection data and WIP data for wafers processed by the respective fabrication facility 142-149. For instance, a first fabrication facility 142 may communicate inspection data and WIP data about the wafers processed by the first fabrication facility 142, and the second fabrication facility 143 may communicate inspection data and WIP data about the wafers processed by the second fabrication facility 143.

The pattern detection device 124 may generate fingerprint patterns based on the WIP data and the inspection data received from the fabrication facilities 142-149. By having additional data from multiple facilities, the pattern detection device 124 may be able to better recognize fingerprint patterns for specific tools.

Each of the fabrication facilities 142-149 may access the fingerprint library 125 stored in the server 140. For instance, the fingerprint library may be a robust fingerprint library 125 based on data from multiple fabrication facilities 142-149. Accordingly, the fingerprint library 125 may have better data than any individual fingerprint library based on data from only a single fabrication facility.

The fabrication facilities 142-149 may also have access to the pattern detection device 124. For example, the first fabrication facility 142 may upload inspection data and/or WIP data for one or more wafers to be processed by the pattern detection device 124 in the cloud-based server 140. The pattern detection device 124 processes the received inspection data and/or WIP data and returns a result including defect type and/or tool and/or process that caused the defect. The result may be transmitted to the fabrication facility through a variety of manners. For instance, the result may be transmitted via an electronic message in the form of a notification or other message type. The result may also be transmitted via a dashboard or other similar interface that is accessible via a network connection, such as the Internet.

Figure 2:
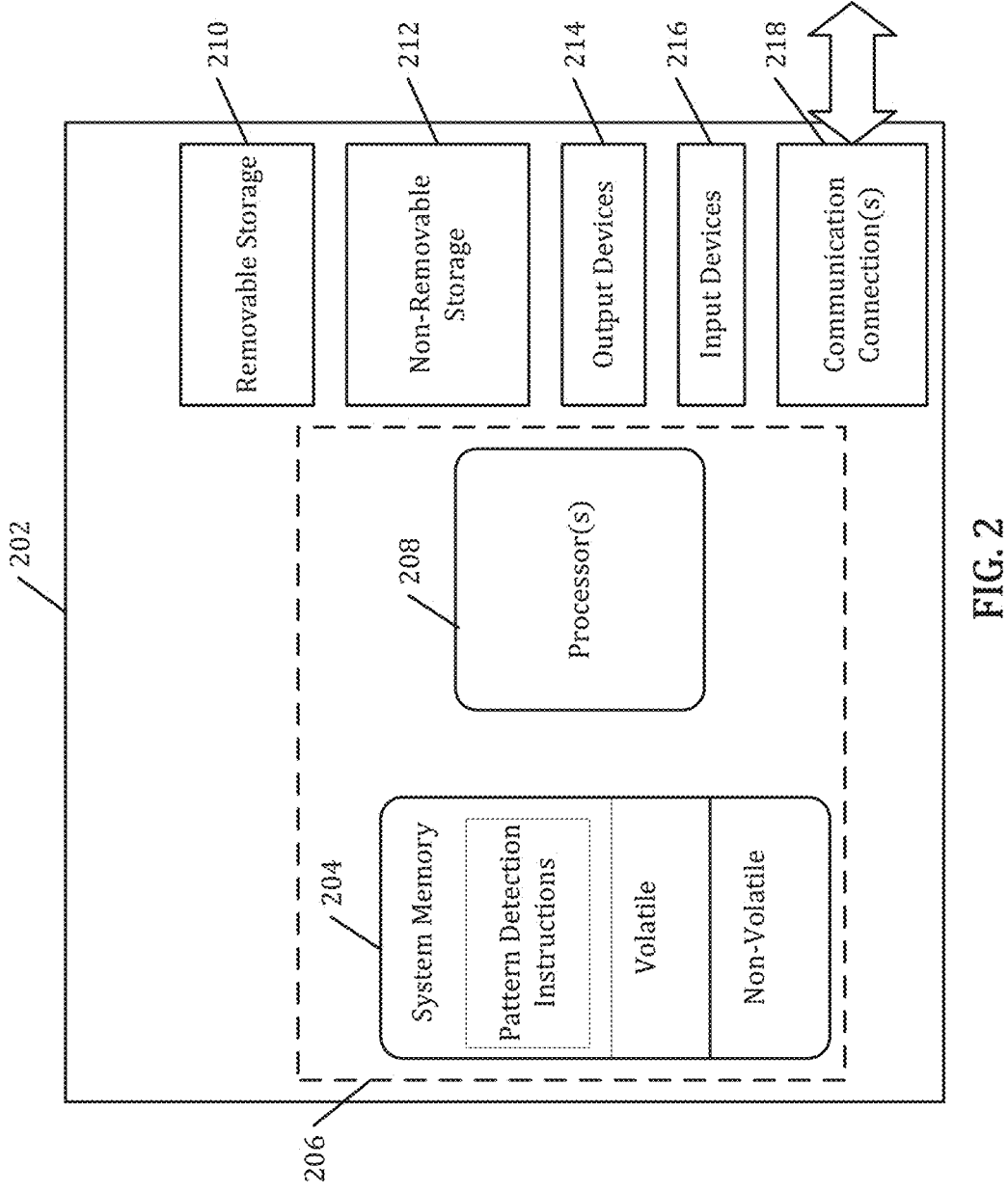
FIG. 2 depicts an example computing device.
Figure 7:
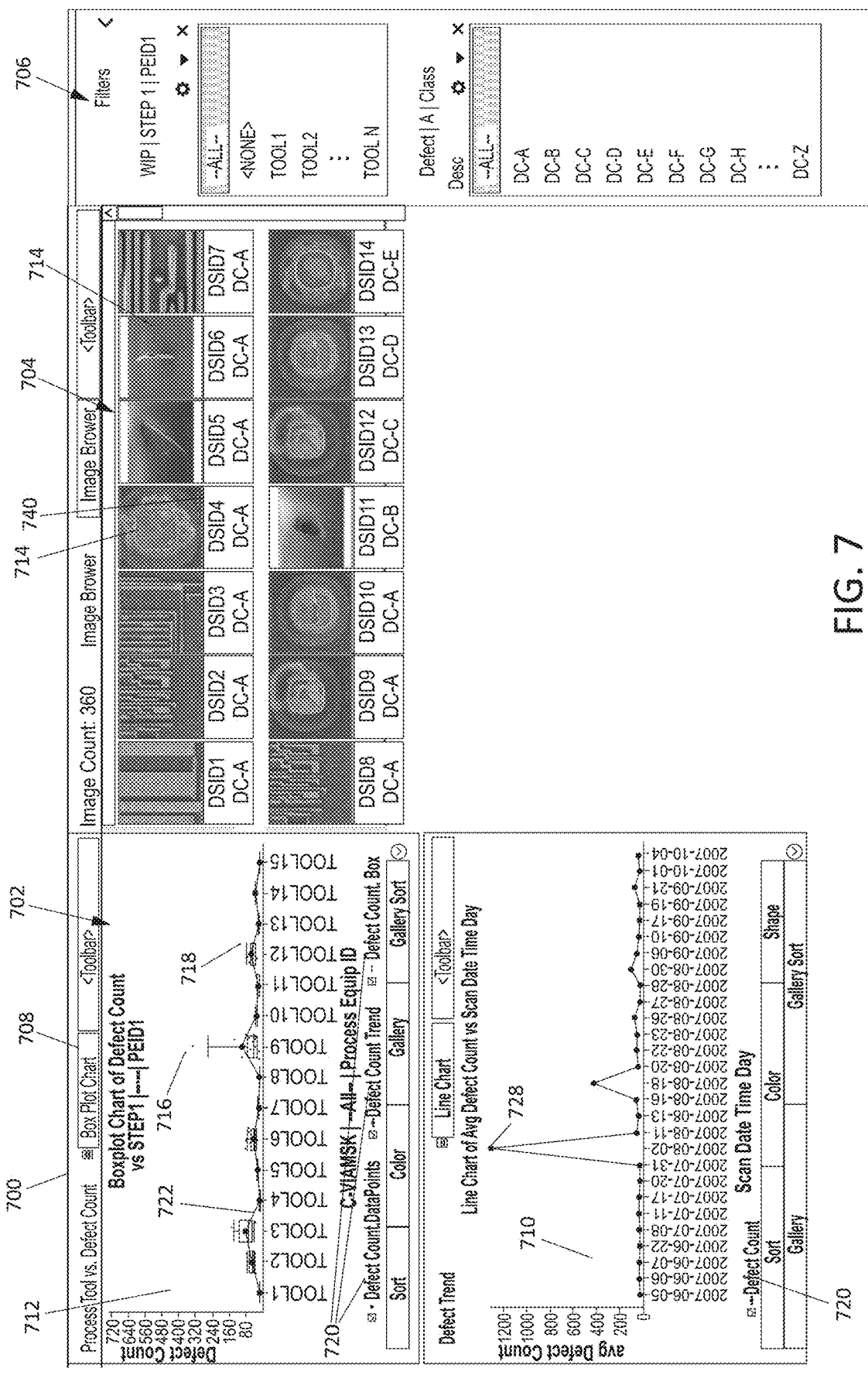
FIG. 7 depicts an example graphical user interface generated by the computing device of FIG. 2.
Figure 8:
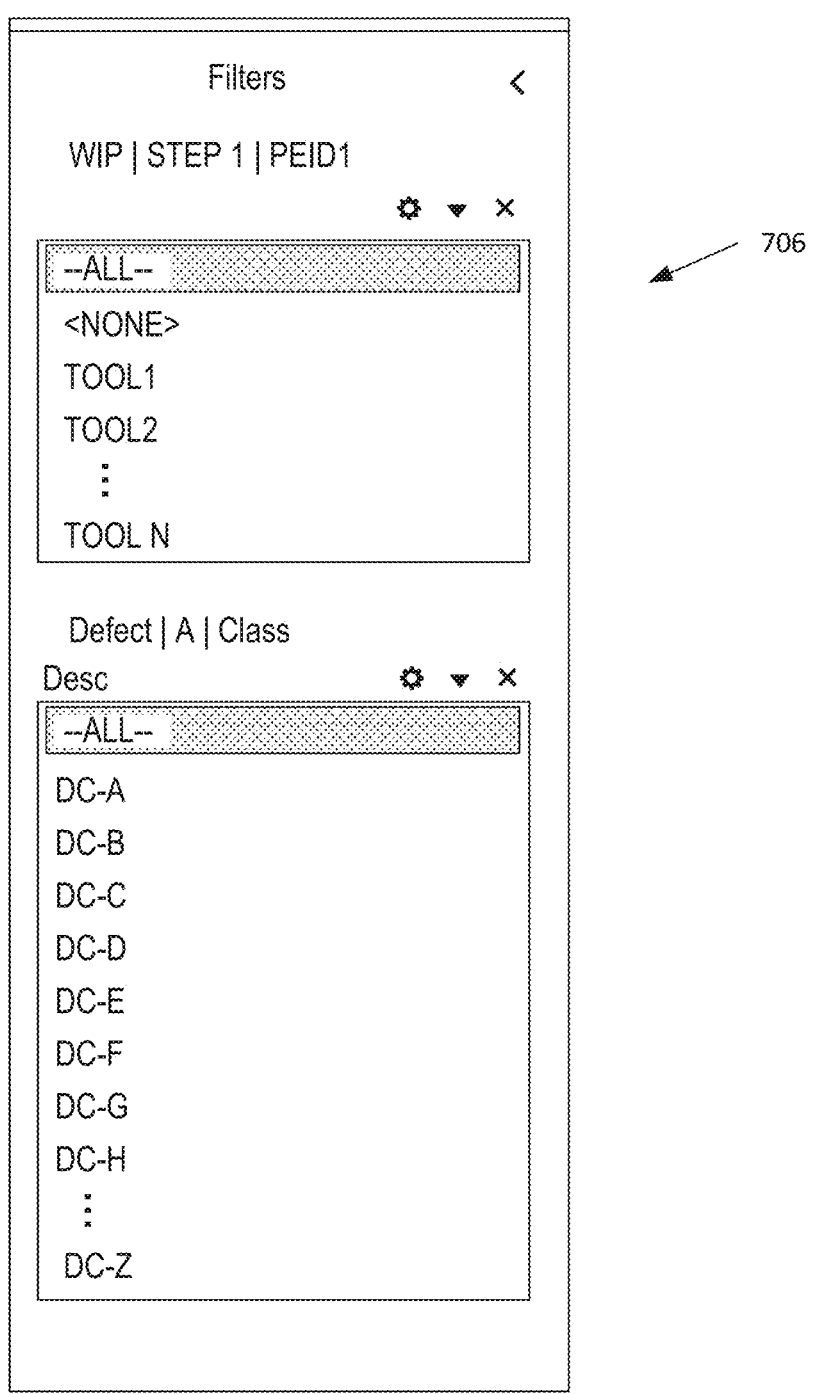
FIG. 8 depicts an enlarged view of a portion of the graphical user interface of FIG. 7.

FIG. 2 depicts an example computing device 202 that may be used with the present technology. The computing device 202 may be a server and/or other computing device that performs the operations discussed herein, such as the pattern recognition operations and the fingerprint library generation operations. In some examples, the computing device 202 is configured to generate dynamic graphical user interfaces, such as those shown in FIGS. 7-8 and, via such interfaces, to receive input and to provide output responsive to the input. The computing device 202 may include computing components 206. The computing components 206 include at least one processor 208 and memory 204. Depending on the exact configuration, memory 204 (storing, among other things, pattern detection instructions and instructions to perform the operations disclosed herein) can be volatile (such as RAM), non-volatile (such as ROM, flash memory, etc.), or some combination of the two. The memory 204 can also store, for example, instructions that, when executed by the processor(s) 208, generate and perform the functions of the graphical user interfaces of FIGS. 7-8. Further, the server 202 may also include storage devices (removable 210, and/or non-removable 212) including, but not limited to, solid-state devices, magnetic or optical disks, or tape. Further, the computing device 202 may also have input device(s) 216 such as touch screens, keyboard, mouse, pen, voice input, etc., and/or output device(s) 214 such as a display, speakers, printer, etc. In some examples, user input to the graphical user interfaces of FIGS. 7-8 is provided via the input device(s) 216, and the graphical user interfaces and further output responsive to the input is provided via the output device(s) 214, such as the display. One or more communication connections 218, such as local-area network (LAN), wide-area network (WAN), point-to-point, Bluetooth, RF, etc., may also be incorporated into the computing device 202.

Figure 3:
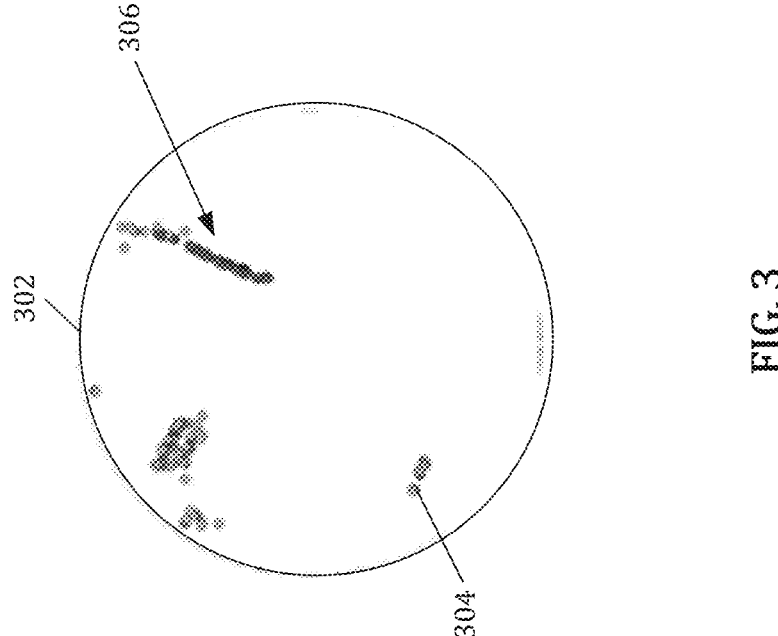
FIG. 3 depicts an example defect map.

FIG. 3 depicts an example defect map 302. The example defect map 302 includes a plurality of defect indicators 304. The defect indicators 304 indicate the location of an individual defect. The defect indicators 304 may also have a color or other display feature that indicates additional detail about the particular defect, such as intensity of a defect, size of the defect, whether the defect is on the surface of the wafer, and/or whether the defect is into the surface of the wafer. Such details about a particular individual defect may be referred to as individual defect attributes or details.

The defects may form in defect groupings 306 on the wafer. The defect groupings 306 may form different patterns, such as patterns that are recognized by SPR and the technology discussed herein. In the example defect map 302 shown in FIG. 3, the identified defect grouping 306 is indicative of a scratch. For instance, as can be seen from the defect grouping 306, a line or curve is formed that appears to be a scratch. Based on the WIP data for the wafer corresponding to the example wafer map 302, the set of tools and/or processes that generated the scratch is known. Using the technology disclosed herein, the particular tools and/or processes that generated the scratch can be identified.

Figure 4:
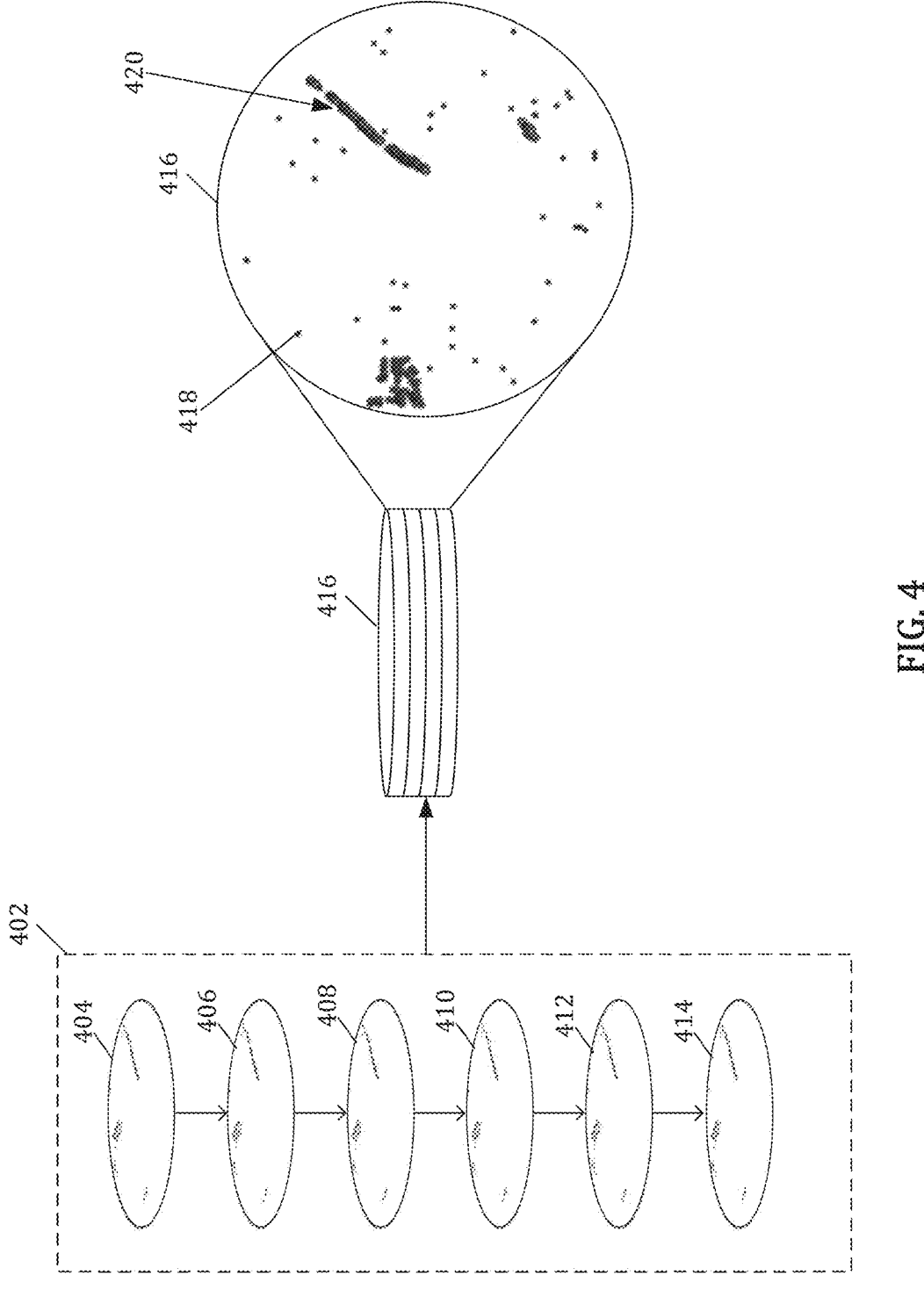
FIG. 4 depicts an example stacked virtual wafer map.

FIG. 4 depicts an example stacked virtual wafer map 416. In some instances, the defect pattern in a single wafer map may be faint, which makes pattern recognition difficult. To help alleviate that issue, the present technology is able to amplify the pattern to allow for better pattern recognition. For example, the present technology can "stack" the defect or wafer maps from multiple wafers that were processed by the same tool or set of tools. For instance, all defects from a group of wafers processed by the tool may be added together and represented in a single wafer map, referred to as a stacked virtual wafer map.

As depicted in FIG. 4, a set of wafer maps 402 are accessed or received. The wafer maps 402 include a first wafer map 404, a second wafer map 406, a third wafer map 408, a fourth wafer map 410, a fifth wafer map 412, and a sixth wafer map 414. While six wafer maps are depicted as being included in the set of wafer maps 402, it should be appreciated that a fewer or greater number of wafer maps may be included in the set of wafer maps 402. For instance, in some examples, the set of wafer maps 402 may include at least 10, 20, or 100 wafer maps.

The set of wafer maps 402 may include only wafer maps from a specific fabrication stage for each respective wafer. For example, at a particular fabrication stage in a fabrication line, a wafer may be inspected, and a wafer map may be generated for that time point. The set of wafer maps 402 is made up of wafer maps all generated at that fabrication stage or point in time and processed by the same tools. The set of wafer maps 402 may be selected based on the wafers being processed by a particular tool or process. Accordingly, if a fingerprint is being left by a specific tool in the fabrication line, all (or many) wafers processed by that tool should have the fingerprint, albeit faint in some cases.

Of note, the set of wafer maps 402 used to generate the virtual wafer map 416 may be from different lots. For instance, wafers from a single lot may not have gone through all the same tools and/or steps. As some background, when a wafer is first made, silicon may be formed into an ingot. The ingot is cut into thin wafers. Several of these wafers (e.g., 15-20) are stored in a cassette, which are referred to as a lot. Lots are often analyzed together, but in the present technology, such a focus can be less helpful.

The set of wafer maps 402 are additively combined to form a stacked virtual wafer map 416. For instance, the defects from each of the wafer maps 404, 406, 408, 410, 412, 414 in the set of wafer maps 402 are added to a single wafer map referred to as the stacked virtual wafer map 416. The virtual wafer map 416 includes a plurality of defect indicators 418 indicating the location of the combined defects from the set of wafer maps 402. The location of the defect indicator indicates a location of the defect. The color (or other display indicator (e.g., grayscale shade)) of the defect indicators 418 may indicate the number of defects at that particular location in the set of wafer maps 402. For instance, if a particular location of the virtual wafer map 416 has a recorded defect in only one wafer map, the corresponding defect indicator 418 may be displayed as black. In contrast, if the particular location of the virtual wafer map 416 has a recorded defect in more than 50% or all of the wafer maps in the set of wafer maps 402, the defect indicator 418 may appear as red (or some other color or with some other indicator indicating a higher number of defects at that location). In some examples, the stacked virtual wafer map 416 may be represented as a heat map based on the number of defects at a particular location across all the wafer maps in the set of wafer maps 402. The underlying data representing the stacked virtual wafer map 416 may also indicate the defect count for each location of the wafer.

By adding the defects from the set of wafer maps 402, the patterns of defect groupings 420 may become more apparent. For example, a defect grouping 420 may become more apparently a scratch, a donut, or other shapes and patterns as will be recognized by those having skill in the art. Thus, defect patterns and the root causes of those defects may be identified more quickly or sooner than using a single wafer map, and future defects can be prevented more quickly. However, an increase in noise may also occur. As such, filters may be applied to the virtual wafer map 416 to remove, or apply a lesser weight to, defects that infrequently occur in the set of wafer maps 402. The virtual wafer map 416 may also be used in generating fingerprint patterns and correlations for the fingerprint library discussed above.

A first virtual wafer map 416 based on first set of wafer maps 402 may be compared to another or second virtual wafer map based on second set of wafer maps to determine a pattern trend. For instance, the first virtual wafer map may be generated from wafer maps that passed through a set of fabrication tools first (e.g., wafers one through ten). The second virtual wafer map may be generated from wafer maps that passed through the set of fabrication tools second (e.g., wafers eleven through twenty). If a defect grouping in the first virtual wafer map weakly indicates a particular defect type and/or a particular root cause, but a defect grouping the second virtual wafer map more strongly indicates the particular defect type and/or particular root cause, a determination may be made that a tool and/or process is degrading and beginning to cause more serious (or more frequent) defects on the wafers.

While the stacked virtual wafer map 416 is formed from defect maps indicating the location of individual defects on the wafer, wafer probe data and/or metrology data may also be used to form stacked virtual wafer maps. For example, wafer probe data may be represented as the location of each die that was tested and include an indication of whether the die passed or failed the probe test. That wafer probe data may be stacked in a similar manner as the defect data to form a stacked virtual wafer map representing probe data. Similar to the stacked defect map discussed above, a stacked virtual wafer map may be from wafer probe data all generated for wafers at the same fabrication stage or point in time and processed by the same tools. In some examples, the stacked virtual wafer map may include the defect data and the wafer probe data.

Metrology data may be similarly used to form a stacked virtual wafer map. For example, the metrology data may be represented as a gradient of a measured value across the wafer. Those gradient representations, or gradient wafer maps, may be stacked (e.g., additively combined) to form a stacked virtual wafer map representing the metrology data for wafers at the same fabrication stage or point in time and processed by the same tools. In some examples, the stacked virtual wafer map may include a combination of two or more of the defect data, the wafer probe data, and/or the metrology data.

Figure 5:
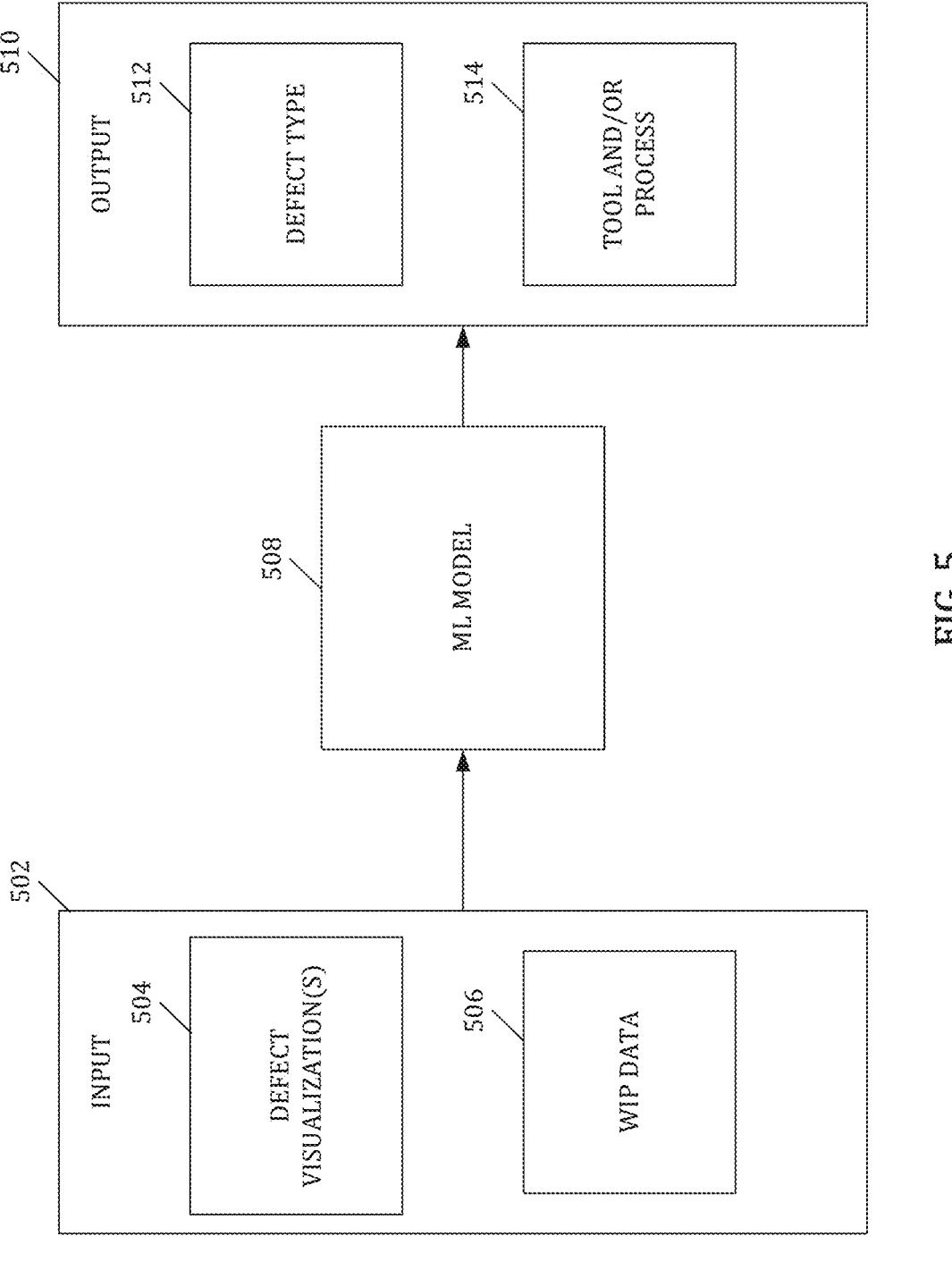
FIG. 5 depicts an example of using a machine learning model to identify a tool or process causing one or more defects on a wafer.

FIG. 5 depicts an example of using a machine learning model 508 to identify a tool or process causing one or more defects on a wafer. An input 502 is generated that includes one or more defect visualizations 504. The defect visualization 504 is an artificial image generated from the inspection of one or more wafers. When generated from the defect data, the artificial image generally represents defects and the defect locations of one or more wafers. For example, the defect visualization 504 may be an image of the defect map itself (effectively a circle with a plurality of dots, which may be grayscale or color). When generated from the wafer probe data, the artificial image generally represents the tested die locations and whether the respective die passed or failed the wafer probe test. When generated from the metrology data, the artificial image generally represents the measured value (s) across the wafer. Each artificial image may be considered a different defect visualization. Accordingly, the input 502 may include multiple defect visualizations 504 that represent different types of inspection data.

In other examples, the defect visualization 504 may be an image of a stacked virtual wafer map. The data visualization 504 may also be another form of a visualization, such as a defect heatmap based on the density of the defects in locations of the wafer. The data visualization 504, however, may not be an actual photograph or optically obtained image of the wafer. Rather, the data visualization 504 may be an artificially created visualization representing the defects of one or more wafers or other inspection data of one or more wafers.

For instance, the artificial visualization can include stacked wafer probe data. According to this example, the artificially created visualization can represent a cumulative frequency of a die pass/fail test value across all wafer maps, and that value can be used to recognize wafer patterns.

As another example, the artificial visualization can include stacked metrology data from multiple wafers based on our previous grouping logic. According to this example, the artificially created visualization can represent the statistics of each site across multiple wafers, and those statistics can be used to recognize wafer patterns.

In some examples, the input may also include the WIP data 506 for the wafer or wafers corresponding to the inspection data utilized to generate the defect visualization 504. Where the defect visualization 504 is generated from inspection data for a single wafer, the WIP data 506 corresponds to the single wafer. Where the defect visualization 504 is generated from a stacked virtual wafer, the WIP data 506 is for one or more wafers for which inspection data was used to generate the stacked virtual wafer. For the stacked virtual wafer discussed above that is generated from wafer maps all obtained for the same fabrication step, the WIP data for all the wafers at that fabrication step is the same (barring time stamps). In some examples, the WIP data 506 may be provided as metadata of the defect visualization 504.

The input 502 is provided to the machine learning (ML) model 508. The ML model 508 may be a neural network, such as a convolutional neural network. As discussed above, the ML model 508 may be trained on patterns stored in the fingerprint library. The ML model 508 processes the input 502 to generate an output 510.

The output 510 may include a classification of a defect type 512. The defect type may be a scratch, a cluster center, a heavy edge, a litho stripe, a horizontal line, and/or a donut, among other pattern types that will be recognized by those having skill in the art. Alternatively or additionally, the output 510 may include the tool and/or process 514 that caused the defect corresponding to the defect type 512. For instance, the particular fabrication tool, fabrication process, inspection tool, and or inspection process that caused the defect type may be included in the output 510.

FIG. 6 depicts an example method 600 for identifying a tool or process causing one or more defects on wafers. The operations of method 600 may be performed by one or more devices discussed above, such as the devices and systems discussed above in the above figures. At operation 602, inspection data for one or more wafers at a particular fabrication step is received. For instance, a pattern detection device may receive inspection data for a plurality of wafers that have undergone the same fabrication steps by the same fabrication tools. In some examples, operation 602 may include inspecting the wafers at the fabrication step to generate the inspection data. The inspection data may be in the form of defect or wafer maps indicating the locations of the defects, wafer probe data indicating pass/fail of tested die, and/or metrology data indicating measured values across the wafer. The inspection data may include a first wafer map for a first wafer and a second wafer map for a second wafer.

At operation 604, a stacked virtual wafer is generated from at least a portion of the inspection data received in operation 602. The stacked virtual wafer map may be generated by additively combining the wafer maps received in operation 602. The stacked virtual wafer map may be of the type of stacked virtual wafer map discussed above with respect to FIG. 4.

At operation 606, a spatial pattern recognition (SPR) operation is performed on the stacked virtual wafer generated in operation 604. The SPR operation may provide an output of a defect type and/or one or more feature vectors representative of a grouping of defects represented in the stacked virtual wafer map. The SPR operation may be performed on the inspection data representing stacked virtual wafer map (e.g., text data) rather than an actual image of the stacked virtual wafer map.

At operation 608, a fingerprint library may be queried with the output of the SPR operation. For instance, the fingerprint library may be queried to identify the closest defect type in the fingerprint library to the defect type identified by the SPR operation. Additionally or alternatively, a feature vector produced by the SPR operation may be used to query the fingerprint library to find the closest feature vector stored in the fingerprint library. As discussed above, patterns (e.g., defect type and/or feature vectors) stored in the fingerprint library are correlated with one or more processes or tools that may have caused the particular defect pattern (e.g., defect type and/or feature vector). In some examples, the correlations may be scores or probabilities associated with the most-likely tools or processes that caused the particular defect pattern. Thus, the output of the query performed in operation 608 is one or more tools or processes that caused, or likely caused, the particular defect pattern. Even if a given spatial pattern is linked to multiple physical attributes or possible defects, this information can beneficially indicate that an inspection tool and/or process should be evaluated to refine the inspection and its ability to discern between similar patterns.

Accordingly, at operation 610, the one or more tools and/or processes that caused, or likely caused, the particular defect pattern are identified. These tools and/or processes are identified based on the result of the query performed in operation 608. For instance, the tools and/or processes may include a list of tools and/or processes and their respective scores or likelihoods that they caused the defect. The identified tools and/or processes may include one or more of: a fabrication tool, a fabrication process, an inspection device, or an inspection process. The identification of the one or more tools or processes that caused, or likely caused, the particular defect pattern may also be based on WIP data for the wafers for which the inspection data was received in operation 602. The WIP data may help refine or eliminate some of the identified tools and/or processes. For instance, if the result of the query in operation 608 includes a tool that is not in the WIP data, that tool may be removed from the listing of possible tools that may have caused the defect pattern.

In addition to, or alternatively to, the SPR operations and identifications, a machine learning model and an artificial defect visualization may also be used to generate similar identifications of tools and/or processes that may have caused defects on the wafer. Such operations are depicted as operations 612, 614 and 616.

At operation 612, one or more artificial defect visualizations are generated for the stacked virtual wafer generated in operation 604. The one or more artificial defect visualizations may be the types of artificial defect visualizations discussed above with reference to FIG. 5. At operation 614, the one or more artificial defect visualizations are provided to, and processed by, a trained ML model. The ML model may be trained based on the correlated pairs of fingerprint patterns and tools and/or processes stored in the fingerprint library. In some examples, WIP data for the wafers for which the inspection data was received in operation 602 may also be included as input into the trained ML model. As discussed above, the WIP data may be provided as metadata of the one or more artificial defect visualizations. The output of the trained ML model may include the tools and/or processes that may have caused one or more defects represented in the stacked virtual wafer map generated in operation 604. The output of the trained ML model may also include a defect type.

At operation 616, the one or more tools and/or processes that caused, or likely caused, the particular defect pattern are identified. These tools and/or processes are identified based on the output of the ML model. For instance, the tools and/or processes may include a list of tools and/or processes and their respective scores or likelihoods that they caused the defect. The identified tools and/or processes may include one or more of: a fabrication tool, a fabrication process, an inspection device, or an inspection process. In examples where the WIP data was not provided as input to the ML model in operation 614, the WIP data may be used in the identification operation 616. The WIP data may help refine or eliminate some of the identified tools and/or processes. For instance, if the output from the ML model includes a tool that is not in the WIP data, that tool may be removed from the listing of possible tools that may have caused the defect pattern.

At operation 618, a notification of one or more of the tools and/or processes that caused one or more defects on the wafers (for which inspection data was received in operation 602) is generated. Generating the notification may include combining the tools and/or processes (along with any scores and/or probabilities) that were identified in operations 610 and 616. For instance, the processes and/or tools may be ranked based on their respective scores and/or probabilities identified in operations 610 and 616. A top set of tools and/or processes (e.g., top 3), along with their scores or probabilities, may be provided in the generated notification. The notification may then be sent, delivered, or displayed to inform the engineer of that adjustment to a tool and/or process needs to be made to improve yield and prevent further defects on wafers.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurement techniques utilized herein. To the extent such terms may not be clearly defined or understood by one having skill in the art, the term "about" shall mean plus or minus ten percent.

FIG. 7 depicts an example graphical user interface 700, or dashboard, generated by the computing device of FIG. 2. The dashboard 700 includes dynamic features that facilitate and expedite comprehension of tool and defect data generated by the system 202. Features of the dashboard 700 allow for tool and defect data to be presented and manipulated (e.g., filtered, sorted, ranked, compared, displayed) in many different ways, such that data reflecting automatically identified defect generating tools or processes as described above can be isolated from other data, visualized and confirmed, and any warranted remediation of problematic tools or processes can be set in motion quickly and efficiently, thereby minimizing the negative impact of a defective tool or process of a wafer fabrication system (such as the system 100 (FIG. 1)).

The interface 700 includes a data chart panel 702, an inspection image panel 704, and a data filter panel 706 that are, in this example, side-by-side on the interface 700.

A drop-down menu 708 provides selectable options for how tool and/or defect data is presented in the data chart panel 702. In the example shown, a boxplot selection and a line chart selection have been selected, and the panel 702 includes a corresponding box plot chart 712 and a corresponding line chart 710. Other example data chart structures that can be selected via the menu 708 for presentation in the panel 702 can include, e.g., a variability chart, a probability chart, a trend chart, a line chart, an XY chart, a vector chart, a polar chart, a heatmap chart, a pie chart, a bubble chart, a three dimensional point chart, a three dimensional bar chart, a three dimensional surface chart, a three dimensional water fall chart, and/or or a table.

Which data is presented in the chart or charts of the panel 702 and, correspondingly, which inspection images obtained by wafer inspection equipment are displayed in the panel 704, are selectable via the selectable filter options displayed in the filter panel 706, of which an enlarged view is depicted in FIG. 8. For example, the filter options displayed in the filter panel 706 allow the data displayed in the panel 702 and correspondingly, the images displayed in the panel 704, to be filtered, by selection of one or more filters. For example, one or more filters can be selected to show data corresponding to a particular fabrication or inspection process or processes, a particular fabrication or inspection tool or tools, a particular timeframe or timeframes, a particular defect or class of defect (e.g., all defects corresponding to a particular stored fingerprint or fingerprints), and so forth.

Each image 714 presented in the panel 704 can represent, e.g., a defect map or a portion of a defect map, such as the defect grouping 306 of the defect map 302 of FIG. 3. Similarly, each image 714 can represent, e.g., a stacked virtual wafer map, or a portion of a stacked virtual wafer map, such as the defect grouping 420 of the stacked virtual wafer map 416 of FIG. 4. Adjacent each image 714, the panel 704 can display information 740 about that image. For example, the information 740 can include a defect site identification (DSID) for the defect in the image and a defect type or class (DC) of the defect in the image. Other types of information can be provided in the information 740.

In the example interface 700, filters and data presentation options have been selected such that the boxplot 712 is displayed. The boxplot 712 indicates, along the vertical axis, a number of defects identified for each of the tools (Tool 1 through Tool 15) represented along the horizontal axis. The tool and defect number data are all associated with a particular wafer fabrication process step (Step 1) and a particular process equipment identifier (PEID 1). That is, each of the tools Tool 1 through Tool 15 are associated with the same process equipment identifier (e.g., are associated with the same manufacturer or the same fabrication facility) and used for the same wafer fabrication step (e.g., an etching step or a deposition step).

As mentioned, the images presented in the panel 704 can correspond to the data presented in panel 702. Further advantageously, subsets of data presented in the panel 704 can be selected, causing the panel 704 to display only those images that correspond to the selected data subset. In this manner, a visual verification of particular inspection data can be performed quickly using the interface 700. For instance, each data point 716, 718 can represent, for a given tool and a given wafer lot, a number (or count) of defects identified by the system 202 (FIG. 2) in that wafer lot.

The distribution of defect counts across lots for each tool is reflected in the boxplot. For example, the horizontal line in each box can correspond to the median or mean defect count per lot or per wafer for each tool, with the box representing a predefined deviation (e.g., a standard deviation) of the data from the mean or median, and the bars above and below the box representing a further deviation from the mean or median. Thus, for example, the data points 716 and 718 are outliers for their corresponding tools, in that they fall outside of the bounds of the corresponding box plots. A user can select a data point 716 or 718 (or more than one data point), and the defect images corresponding to the selection then populate the panel 704. For instance, by selecting the data point 716 in the panel 702, the images of the defects detected in the wafer or lot of wafers corresponding to the data point 716 are displayed in the panel 704, allowing the user to quickly visually verify the nature of the defects of the outlier(s) selected.

Similarly, the data presented in the panel 702 and the corresponding images presented in the panel 704 can be filtered by selection of any of a large number of filter parameters from the panel 706. For instance, only defects corresponding to wafer-in-progress (WIP) wafers, a specific tool, and a specific defect type (e.g., a scratch) can be selected for presentation in the panel 702, and the images corresponding to a subset of those defects selected in the panel 702 (e.g., the defects for a single selected wafer lot) are automatically populated in the panel 704.

The drop-down menu 708, the filters selectable from the filter panel 706, and other selectable data presentation options 720 allow the defect data obtained by the system 202 (FIG. 2) to be viewed and analyzed in a variety of different ways, which can facilitate how analysis and remediation are implemented. For example, the interface 700 can be manipulated to rank tools or processes according to defect count, such that the tools or processes causing the most defects can be identified quickly for priority remediation over other tools or processes.

Some examples of options for viewing data using the interface 700 have already been described. In addition, the box plot 712 is displaying (by selection of one of the options 720) a trend line 722. The trend line 722 can, for example, provide a quickly recognizable visualization of specific tools that are underperforming or overperforming compared to the trend line, which can prompt a more detailed investigation of a specific underperforming tool, for example, by selecting and viewing defect images corresponding to the underperforming tool.

The line chart 710 is another example of selection of specific options for viewing data using the interface 700.

The line chart 700 provides the user defect counts (or average defect counts) detected over time, with number (or average number) of defects along the vertical axis, and the corresponding date and/or time of the defects along the horizontal axis. The line chart 710 can enable a quick determination of when a tool or process may have had an issue that caused defects (represented by a large defect count on a specific day), and whether the issue was subsequently resolved (represented by a drop of defect count or lack of a drop of defect count on one or more subsequent days).

Like the box plot chart 712, a subset of data represented in the chart line chart 710 (such as the data point 728 representing a defect count on a specific day for a specific process and/or a specific tool), can be selected to automatically populate the defect images corresponding to the selected data subset in the panel 704.

Thus, the interface 700 provides a dashboard with highly robust functionality for viewing and manipulating wafer defect data to identify and remediate wafer fabrication and/or inspection problems issues quickly and efficiently.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method for identifying a tool or process causing wafer defects, the method comprising:

generating first inspection data by inspecting, by a first inspection device, a plurality of wafers after each of the plurality of wafers has been processed by a first fabrication tool performing a first fabrication process on each of the plurality of wafers and not by a second fabrication tool;

generating second inspection data by inspecting, by a second inspection device, the plurality of wafers after each of the plurality of wafers has been processed by the second fabrication tool performing a second fabrication process on each of the plurality of wafers;

generating a plurality of first wafer maps corresponding to the plurality of wafers based on the first inspection data;

generating a plurality of second wafer maps corresponding to the plurality of wafers based on the second inspection data;

stacking the plurality of first wafer maps together to provide a first stacked virtual wafer map;

stacking the plurality of second wafer maps together to provide a second stacked virtual wafer map;

performing spatial pattern recognition (SPR) operations on the first stacked virtual wafer map and the second stacked virtual wafer map; and based on an output of the SPR operations, identifying at least one of the tool or the process that caused a defect of at least one of the plurality of wafers.

2. The method of claim 1, wherein one of the plurality of first wafer maps or the plurality of second wafer maps represents locations of defects of one of the plurality of wafers identified by the first inspection device or the second inspection device.

3. The method of claim 2, wherein each of the plurality of first wafer maps and the plurality of second wafer maps is represented as an image.

4. The method of claim 2, wherein each of the plurality of first wafer maps and the plurality of second wafer maps is represented as an artificially created visualization.

5. The method of claim 4, wherein the artificially created visualization includes stacked wafer probe data or stacked metrology data.

6. The method of claim 1, further comprising:

providing an image or an artificially created visualization of one of the plurality of first wafer maps or the plurality of second wafer maps as input into a trained machine learning model;

processing the image or the artificially created visualization by the trained machine learning model to generate another output; and based on the another output from the trained machine learning model, generating an indication of a type of the defect.

7. The method of claim 1, further comprising:

generating recognized fingerprint patterns based on an analysis of the plurality of first wafer maps and first wafer-in-progress (WIP) data for first wafers processed in a first fabrication facility, wherein the first WIP data includes process data and tool data for the first wafers corresponding to the plurality of first wafer maps; and storing the recognized fingerprint patterns into a fingerprint library.

8. The method of claim 7, wherein performing the SPR operations includes comparing the first stacked virtual wafer map to the recognized fingerprint patterns in the fingerprint library.

9. The method of claim 7, further comprising:

generating other recognized fingerprint patterns based on an analysis of other wafer maps and second WIP data for second wafers processed in a second fabrication facility; and storing the other recognized fingerprint patterns in the fingerprint library.

10. The method of claim 7, wherein the fingerprint library is stored in a cloud-based server accessible by a first computing device in the first fabrication facility and a second computing device in a second fabrication facility.

11. The method of claim 1, wherein the SPR operations include using a fingerprint library generated from wafer-in-progress (WIP) data.

12. The method of claim 1, wherein a first of the plurality of wafers and a second of the plurality of wafers are from different wafer lots, respectively.

13. The method of claim 1, wherein the first inspection device is the same as the second inspection device.

14. A method for identifying a tool or process causing wafer defects, the method comprising:

generating first inspection data by inspecting a wafer after the wafer has been processed according to a first fabrication process and not according to a second fabrication process;

generating second inspection data by inspecting the wafer after the wafer has been processed according to the second fabrication process;

generating a first wafer map based on the first inspection data;

generating a second wafer map based on the second inspection data;

performing operations on the first wafer map and the second wafer map; and based on an output of the operations, identifying at least one of the tool or the process that caused a defect of the wafer.

15. The method of claim 14, wherein the first inspection data and the second inspection data are generated, respectively, by different inspection devices.

16. The method of claim 14, wherein the operations include spatial pattern recognition operations.

17. The method of claim 14, wherein the first fabrication process and the second fabrication process are performed by different fabrication tools.

18. The method of claim 14, wherein the first fabrication process and the second fabrication process are different fabrication processes.

19. The method of claim 14, wherein each of the first wafer map and the second wafer map is represented as an image.

20. The method of claim 14, wherein each of the first wafer map and the second wafer map is represented as an artificially created visualization.

21. The method of claim 20, wherein each artificially created visualization includes stacked wafer probe data or stacked metrology data.

22. The method of claim 14, further comprising:

providing an image or an artificially created visualization of the first wafer map or the second wafer map as input into a trained machine learning model;

processing the image or the artificially created visualization by the trained machine learning model to generate another output; and based on the another output from the trained machine learning model, generating an indication of a type of the defect.

23. The method of claim 14, further comprising:

generating recognized fingerprint patterns based on an analysis of wafer maps and wafer-in-progress (WIP) data for wafers, wherein the WIP data includes process data and tool data for the wafers corresponding to the wafer maps; and storing the recognized fingerprint patterns into a fingerprint library.

24. The method of claim 23, wherein performing the operations includes comparing the first wafer map and the second wafer map to the recognized fingerprint patterns in the fingerprint library.

25. A system for identifying a tool or process causing wafer defects, the system comprising:

at least one processor; and non-transitory computer-readable storage storing instructions which, when executed by the at least one processor, cause the system to:

generate first inspection data by inspecting a wafer after the wafer has been processed according to a first fabrication process and not according to a second fabrication process;

generate second inspection data by inspecting the wafer after the wafer has been processed according to the second fabrication process;

generate a first wafer map based on the first inspection data;

generate a second wafer map based on the second inspection data;

perform operations on the first wafer map and the second wafer map; and based on an output of the operations, identify at least one of the tool or the process that caused a defect of the wafer.

26. The system of claim 25, wherein the operations include spatial pattern recognition operations.

27. The system of claim 25, wherein each of the first wafer map and the second wafer map is represented as an image.

28. The system of claim 25, wherein each of the first wafer map and the second wafer map is represented as an artificially created visualization.

29. The system of claim 28, wherein each artificially created visualization includes stacked wafer probe data or stacked metrology data.

30. The system of claim 25, wherein the non-transitory computer-readable storage stores further instructions which, when executed by the at least one processor, cause the system to:

generate recognized fingerprint patterns based on an analysis of wafer maps and wafer-in-progress (WIP) data for wafers, wherein the WIP data includes process data and tool data for the wafers corresponding to the wafer maps; and store the recognized fingerprint patterns into a fingerprint library, wherein performing the operations includes comparing the first wafer map and the second wafer map to the recognized fingerprint patterns in the fingerprint library.

* * * * *